(12) United States Patent
Kung-Ping

(10) Patent No.: US 7,052,128 B1
(45) Date of Patent: May 30, 2006

(54) PEN-SHAPED SPECTACLES REPAIR KIT

(76) Inventor: Su Kung-Ping, Fl. 3, No. 17 Alley 22, Lane 156, Wu-Shing Street, Taipei (TW)

( * ) Notice: Subject to any disclaimer, the term of this patent is extended or adjusted under 35 U.S.C. 154(b) by 0 days.

(21) Appl. No.: 11/094,883

(22) Filed: Mar. 30, 2005

(51) Int. Cl.
G02C 13/00 (2006.01)

(52) U.S. Cl. .............................. 351/42; 81/52; 81/439

(58) Field of Classification Search .................. 351/42, 351/41, 158; 81/52, 439, 440, 436, 438
See application file for complete search history.

(56) References Cited

U.S. PATENT DOCUMENTS 4,300,607 A * 11/1981 Mellinger .................... 81/490
4,827,812 A * 5/1989 Markovetz .................. 81/439
5,442,982 A * 8/1995 Bell ............................ 81/439

* cited by examiner

Primary Examiner—Hung Xuan Dang
(74) Attorney, Agent, or Firm—W. Wayne Liauh

(57) ABSTRACT

A pen-shaped spectacles repair kit includes a pen-shaped body having a two-sectioned case and a cap, and a screwdriver. A rear inner end of the case opposite to the cap is formed into a space for holding some spare parts for spectacles; the screwdriver has a middle body having two blades projected from two ends thereof. The screwdriver is fitted in the case by inserting the middle body into a fixing hole provided at a front end of the case, so that the screwdriver turns when the case is turned. The cap closed to the front end of the case completely covers the projected blade, and a clip provided on the cap allows the pen-shaped spectacles repair kit to be clamped on a user's pocket and conveniently portable for tightening screws on the spectacles at any place and any time.

6 Claims, 2 Drawing Sheets

PEN-SHAPED SPECTACLES REPAIR KIT

FIELD OF THE INVENTION

The present invention relates to a pen-shaped spectacles repair kit, and more particularly to a spectacles repair kit that associates a screwdriver with a pen-shaped body to form a conveniently portable pen-shaped screwdriver for tightening screws or replacing parts on spectacles.

BACKGROUND OF THE INVENTION

Most people in the modern society, including students, the general public, and the retired, wear spectacles for different reasons. Some students wear reading glasses due to watching TV too much or reading under insufficient light source frequently. Some people wear reading glasses because their works require highly precise visual observation or watching monitors over prolonged time, while others wear reading glasses due to hereditary myopia. The retired generally require a pair of distant glasses. Without eyeglasses, these people would have difficulties in reading or working easily. It is therefore necessary for these people to always keep their spectacles in a good condition for service.

There are many screws on the spectacles for fastening the rim, temples, and/or nose pads in place. These screws tend to become loosened to result in useless spectacles. Moreover, these screws are very small in size and require a special small-size screwdriver to tighten or loosen them. People do not usually carry such small-size screwdriver along, and it is not always easy to borrow such special screwdriver at most places. A user might try to use some substitutive thing to tighten the loosened screws and finds it is completely useless. It is also embarrassing when any of the screws, nose pads, or some other parts is got lost.

SUMMARY OF THE INVENTION

A primary object of the present invention is to provide a pen-shaped spectacles repair kit that associates a screwdriver for repairing spectacles with a pen-shaped body, so that the screwdriver could be conveniently carried along with a user to tighten loosened screws or do some other necessary repairs for the spectacles at any time.

Another object of the present invention is to provide a pen-shaped spectacles repair kit in which spare screws, nose pads, and other parts are held for use at any time.

To achieve the above and other objects, the pen-shaped spectacles repair kit of the present invention includes a pen-shaped body having a case and a cap, and a screwdriver. The screwdriver has a middle body having two blades projected from two ends thereof. The screwdriver is fitted in the case by inserting the middle body into a fixing hole provided at a front end of the case, so that the screwdriver turns when the case is turned.

When the cap is closed to the front end of the case, one of the two blades projected from the front end of the case is completely covered by the cap. A clip is provided on the cap, allowing the pen-shaped spectacles repair kit to be conveniently clamped on a user's pocket.

The case is a two-section member to include a front and a rear case that are removably connected together by way of tight fitting. A rear outer end of the front case is formed into a fixing hole for holding a second screwdriver therein. A rear inner end of the rear case is formed into a space for holding some spare parts for spectacles, such as screws and nose pads. A rearmost end of the rear case is formed into a hexagonal cavity adapted to holding a hex nut in place to facilitate tightening or loosening of a screw relative to the nut.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
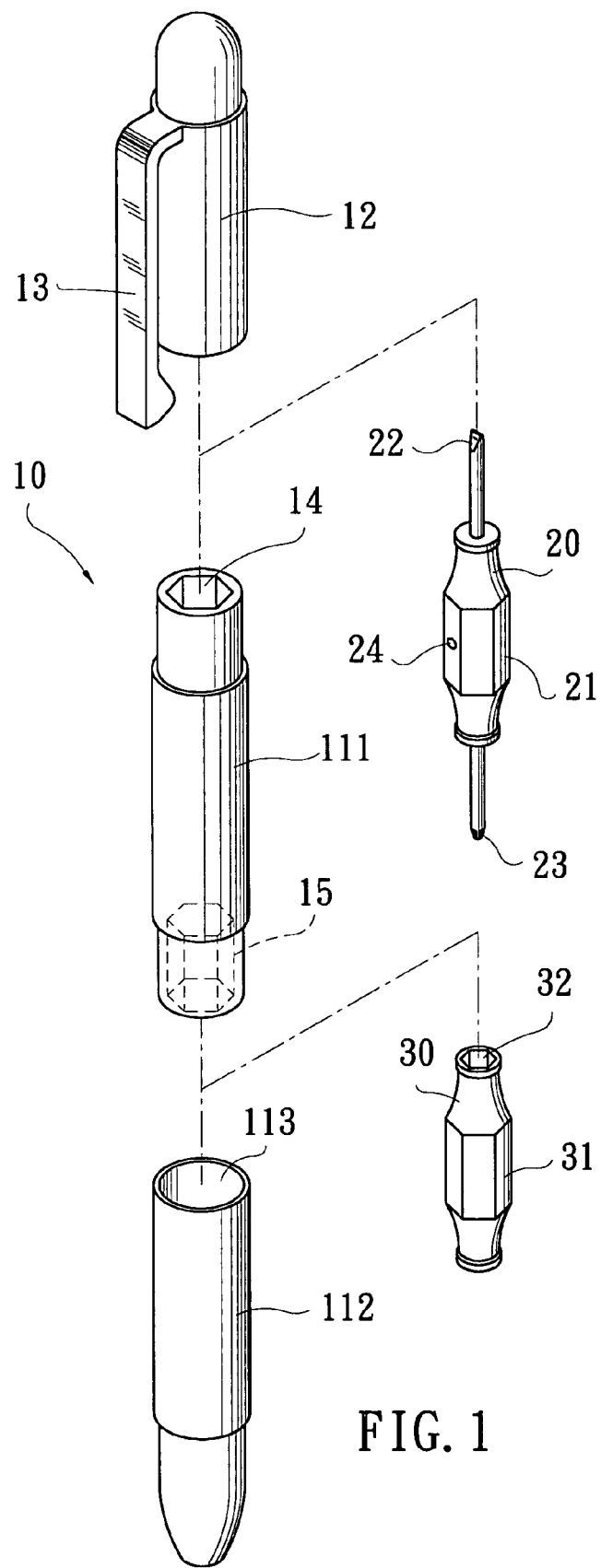
FIG. 1 is an exploded perspective view of a pen-shaped spectacles repair kit according to an embodiment of the present invention.
Figure 2:
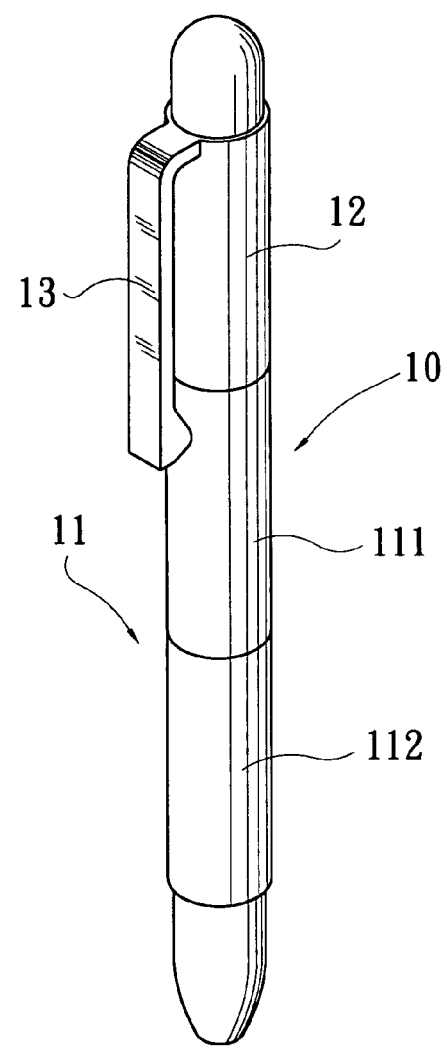
FIG. 2 is an assembled perspective view of the pen-shaped spectacles repair kit of FIG. 1.
Figures 3, 4:
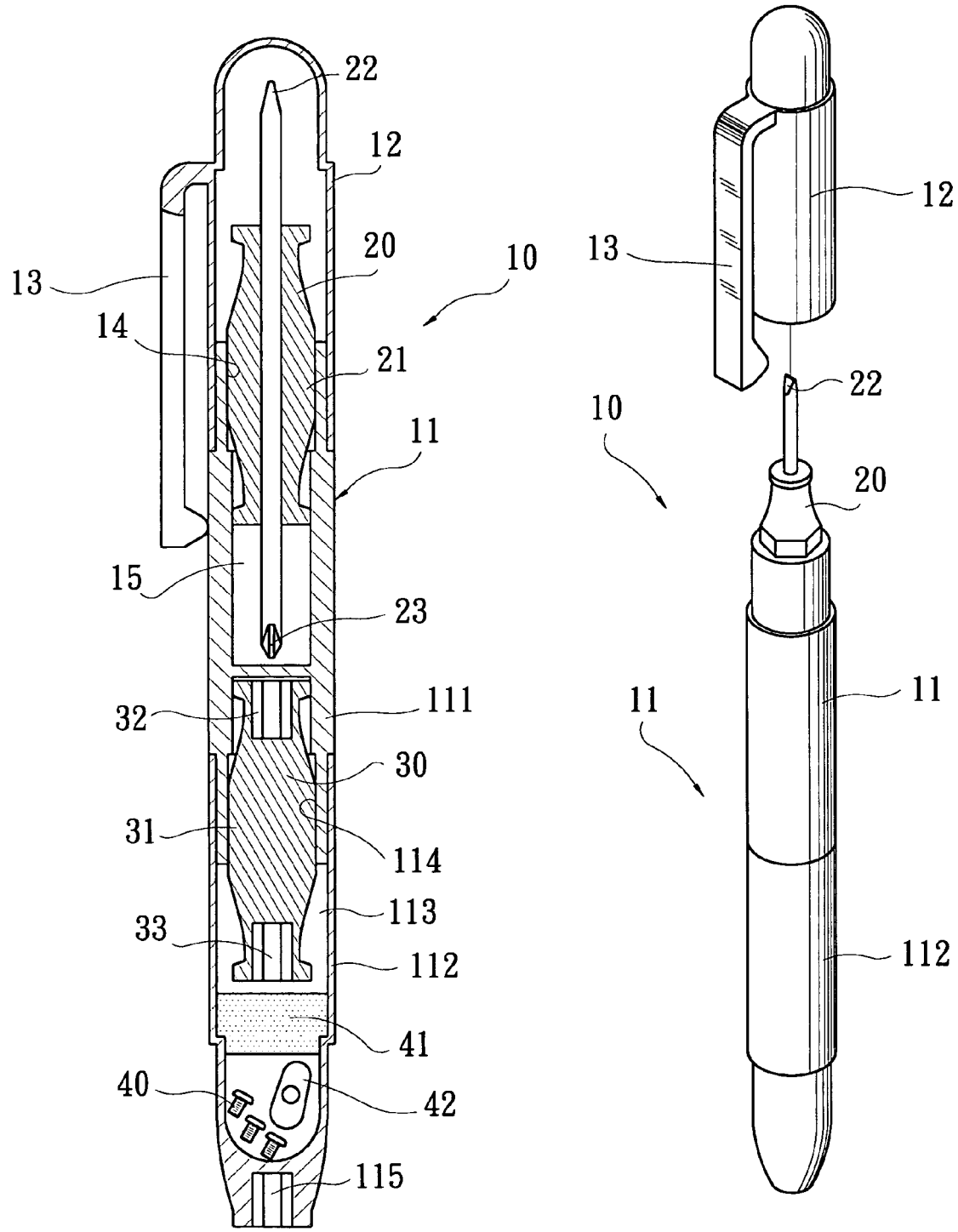
FIG. 3 is an assembled sectional view of the pen-shaped spectacles repair kit of FIG. 2.
FIG. 4 is a perspective view of the pen-shaped spectacles repair kit of FIG. 2 with a cap thereof removed from a pen-shaped body thereof.

Please refer to FIGS. 1 and 2 that are exploded and assembled perspective views, respectively, of a pen-shaped spectacles repair kit according to an embodiment of the present invention, and to FIG. 3 that is an assembled sectional view of the present invention. As shown, the pen-shaped spectacles repair kit of the present invention mainly includes a pen-shaped body 10, and a screwdriver 20.

The pen-shaped body 10 includes a case 11 and a cap 12 having a clip 13 connected thereto for clamping to a user's pocket. The case 11 is provided at a front end directed toward the cap 12 with a fixing hole 14, and behind an inner end of the fixing hole 14 with a receiving space 15.

The screwdriver 20 includes a middle body 21 and two blades 22, 23 separately projected from two ends of the middle body 21. The screwdriver 20 is tightly fitted in the case 11 by inserting the middle body 21 into the fixing hole 14 at the front end of the case 11, such that when the case 11 is turned, the screwdriver 20 is turned at the same time.

The two blades 22, 23 have a keystone tip and a Philips head tip, respectively. The middle body 21 has a non-circular cross section, and may be, for example, a hexagonally sectioned body. The fixing hole 14 formed at the front end of the case 11 has a cross section the same as that of the middle body 21 of the screwdriver 20, such as a hexagonal fixing hole, so that the screwdriver 20 tightly fitted in the case 11 is always turned along with the case 11. When the screwdriver 20 is fitted in the case 11, one of the two blades, for instance, the blade 22, is projected from the case 11, and the other blade 23 is invisibly received in the receiving space 15 in the case 11. A protruded dot 24 may be provided on an outer surface of the middle body 21 of the screwdriver 20, so that the middle body 21 is more tightly fitted in the fixing hole 14 when the screwdriver 20 is inserted into the case 11.

When the cap 12 is closed to the front end of the case 11, the projected blade 22 is completely covered by the cap 12. By clamping the clip 13 on the cap 12 to a user's pocket, the whole pen-shaped spectacles repair kit of the present invention is more easily portable.

To use the spectacles repair kit, simply remove the cap 12 to expose the blade 22, as shown in FIG. 4. The case 11 serves as a handle to turn the screwdriver 20 for tightening or loosening a screw. When it is desired to use the other blade 23, simply remove the screwdriver 20 from the case 11 and insert the blade 22 into the fixing hole 14 at the front end of the case 11 to expose the blade 23 from the case 11. Thus, it is very convenient for a user to change the keystone tip to or from the Philips head tip according to actual need.

The case 11 includes two sections, namely, a front case 111 and a rear case 112 that are removably connected together by way of tight fit. The rear case 112 defines another receiving space 113 therein. The front case 111 is provided at a rear outer end with a fixing hole 114, into which a second screwdriver 30 may be inserted. The second screwdriver 30 has a hexagonally sectioned middle body 31 with a regular hexagonal cavity 32, 33 formed at each axial end thereof. The fixing hole 114 provided at the rear outer end of the front case 111 is a hexagonal hole matching the hexagonally sectioned middle body 31 of the second screwdriver 30, and can therefore firmly hold the second screwdriver 30 inserted therein. When the rear case 112 is removed from the rear outer end of the front case 111, the second screwdriver 30 is exposed for tightening or loosening a screw. Moreover, the receiving space 113 in the rear case 112 may be used to hold some small screws 40, nose pads 42, and other spare parts for spectacles. To avoid the screws 40, the nose pads 42, and other spare parts from dropping off when the rear case 112 is removed from the front case 111, a sponge pad 41 may be positioned in the rear case 112 to stop the screws 40, the nose pads 42, and other spare parts from falling.

The regular hexagonal cavities 32, 33 at two ends of the second screwdriver 30 may be used to tighten or loosen a hex head screw. Moreover, since the hex head screw used on spectacles is usually tightened with the help of a nut, the rearmost end of the rear case 112 is formed into a regular hexagonal cavity 115 for setting around the nut to prevent the same from turning when the second screwdriver 30 is used to turn the screw, so that the screw could be more easily tightened or loosened.

The pen-shaped spectacles repair kit of the present invention has simple structure and is conveniently portable like a pen for a user to timely solve the problem of loosened or separated screws from the spectacles.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A pen-shaped spectacles repair kit, comprising a pen-shaped body, and a screwdriver; said pen-shaped body including a case and a cap; said case being provided at a front end directed toward said cap with a first fixing hole, and behind an inner end of said first fixing hole with a first receiving space; said case being formed from a front and a rear case that are removably connected to each other; said rear case internally defining a second receiving space; said screwdriver including a middle body and two blades projected from two axial ends of said middle body; said screwdriver being tightly fitted in said case by inserting said middle body of said screwdriver into said first fixing hole at the front end of said case, such that one of said two blades is exposed from the front end of said case and the other said blade invisibly received in said first receiving space in said case behind said first fixing hole; whereby when said case is turned, said screwdriver is turned at the same time.

2. The pen-shaped spectacles repair kit as claimed in claim 1, wherein said middle body of said screwdriver is a hexagonally sectioned body, and said first fixing hole provided at the front end of said case is a hexagonal hole matching said hexagonally sectioned middle body of said screwdriver.

3. The pen-shaped spectacles repair kit as claimed in claim 1, wherein said second receiving space in said rear case serves to hold a plurality of screws, nose pads, and other spare parts for spectacles.

4. The pen-shaped spectacles repair kit as claimed in claim 3, wherein said front case is provided at a rear outer end with a second hexagonal fixing hole for a second screwdriver having a hexagonally sectioned middle body to firmly insert therein.

5. The pen-shaped spectacles repair kit as claimed in claim 4, wherein said second screwdriver is provided on at least one of two axial ends with a regular hexagonal cavity.

6. The pen-shaped spectacles repair kit as claimed in claim 3, wherein said rear case is provided at a rearmost end with a regular hexagonal cavity.

* * * * *